United States Patent Office 3,255,081
Patented June 7, 1966

3,255,081
ANTI-VIRAL VACCINES IMMUNIZED AGAINST ONCOGENIC VIRUSES
Jerzy Barski, Paris, France, assignor to Etablissement Public: Centre National de la Recherche Scientifique, Paris, France, a corporation of France
No Drawing. Filed Feb. 12, 1964, Ser. No. 344,200
Claims priority, application Germany, Oct. 18, 1963, C 31,175
4 Claims. (Cl. 167—78)

It is known that certain anti-viral vaccines, such as the antipolyiomyelitis vaccines, are liable to be contaminated by oncogenous viruses.

Thus, B. Sweet and M. Hillman (Proc. Soc. Exp. B. Am., 105, 1960, p. 420) and B. Eddy, G. Borman, G. Grubbs and R. Young (Virology, 17, 1962, pp. 65–75), have emphasized the action of a cancerigenic virus SV–40 on the kidney cell cultures of the Asiatic monkeys, intended for the preparation of vaccines, and more particularly of anti-poliomyelitic vaccines. SV–40 virus has been found to be particularly resistant to various chemical and physical factors and has been repeatedly isolated from vaccine batches, even when said vaccines had been treated in formol. It has also been isolated in numerous subjects vaccinated with such inactivated vaccines.

Moreover, H. Koprowski, J. Ponten, F. Jensen, R. Baudin, P. Moorhead and E. Saksela (J. of Cellular and Comparative Physiology, 59, 1962, pp. 281–292) have observed that, besides the cancerigenic power of the SV–40 virus in new-born hamsters, morphological transformations indicating cellular malignity were found in cultures of human cells contaminated with this virus.

Attempts have already been made to obviate these drawbacks and eliminate said oncogenic virus, particularly by making use of cellular cultures of African monkeys deprived of SV–40 or by applying selective methods of fractionating and inactivating said virus. Such methods prove however insufficient to offer the maximum chances of non contamination of vaccinated individuals by accidental viral agents. The discovery of SV–40 is indeed the proof that an oncogenic virus may propagate in the cells in vitro, as an inconspicuous infection. It is therefore impossible to exclude from the start by the known methods the latent presence of the oncogenic factors of a viral character other than the SV–40 in the usual cultures, of animal or human origin—used for preparing vaccines against the virus-caused diseases.

An object of the invention is to reduce as much as possible the risks of contamination by any kind of viral factor likely to be present in the cultures, which is extremely advantageous, since most of the viruses are either not known, or may not effectively be identified, or their concentration measured.

According to the invention the cellular cultures intended for the propagation of a vaccinating virus or viruses, is added with at least one anti-serum containing, besides the usual antibodies against the normal constituents of the cells or of the medium, antibodies effective against any viral factor liable to occur in said cultures, said anti-serium being prepared from said cellular cultures prior to their contamination by said vaccinating virus or viruses.

The anti-serum prepared, which is active against all the antigens in the cellular culture, will thus act specifically, according to the invention, against any viral factor present in the culture and will neutralize such factors at the time of the production of the vaccine-serum mixture, without the vaccinating virus being affected thereby. In other terms, the anti-serum against the virgin cellular culture, which may possibly be contaminated by an "intrusive" virus, will not affect the titre of the vaccinating virus, as subsequently prepared on the same culture.

Another object of the invention is to provide an anti-serum which is selectively effective on a mixture of viruses, by neutralizing the contaminating virus.

Moreover, the virus-antibody association in the vaccine according to the invention is stable, when subjected to the action of proteolytic enzymes and at an acid pH as is normally the case in the physiological conditions of digestions. Thus, the virus-antibody association will resist pepsic and trypsic digestions in the precise case of the poliome virus selected as the experimentation test. Consequently, and in accordance with the invention, a cancerigenic virus once neutralized by specific antibodies, will not be released again in its infectious form in the system of the vaccinated subject, particularly when the vaccine will be applied orally and exposed, under physiological conditions to the action of proteolytic enzymes of the digestive tract.

In the experimental tests illustrating the operation of the method of the invention, three breeds of poliomyelitis viruses have been used, viz.: Mahoney (type I), Lindes (type II), Saukett (type III). The nonneurotropic breeds utilized for the preparation of the living vaccine of the Sabin type, possess however the same antigenic properties as the three previously mentioned breeds. As an oncogenic virus the poliome SE-breed was used.

The cellular cultures were those of the human TG breeds as described by G. Barski, F. Cornefert and J. Biedler (Ann. Inst. Pasteur, 100, 1961, pp. 324–336).

For the preparation of the anti-serum according to the method of the invention, rabbits were hyper-immunized by intramuscular inoculations of suspensions of TG-cells frozen with their medium. Six injections effected every three days were followed, after eight days' rest, by a repeat-injection. The bleeding in view of the preparation of the anti-serum was practiced six days after the repeat injection. Mixtures of sera derived from two or three simultaneously immunized rabbits were generally employed.

The properties of the vaccine obtained by the method of the invention are illustrated by the following three examples.

*Example 1*

Suspensions of poliomyelitis viruses, obtained by culture of the TG-cellular breed were incubated during one hour at 37° C. with the serum from a rabbit which had been hyper-immunized against the same non contaminated cultures. In another experiment, the incubation at 37° C. was followed by storage of the mixture virus-antiserum during a period of 14 days at the temperature of +2° C. The anti-serum used showed a marked cytotoxic power against the TG-cell cultures. The following table illustrates the results of the virus doses after incubation:

| Virus Type | Incubation With— | Incubation Temperature and Time | Time, $ID_{50}{}^1$ |
|---|---|---|---|
| Polio I | N.R.S.[2] | 1 hour at 37° C | $10^{5.8}$ |
|  | N.R.S | 1 hour at 37° C.+14 days at +2° C. | $10^{5.5}$ |
|  | H.R.S.[3] | 1 hour at 37° C | $10^{5.5}$ |
|  | H.R.S | 1 hour at 37° C.+14 days at 37° C. | $10^{5.5}$ |
| Polio II | N.R.S | 1 hour at 37° C | $10^{4.5}$ |
|  | H.R.S | 1 hour at 37° C | $10^{4.5}$ |
|  | N.R.S | 1 hour at 37° C | $10^{4.5}$ |
| Polio III | N.R.S | 1 hour at 37° C | $10^{4.5}$ |
|  | H.R.S | 1 hour at 37° C | $10^{4.5}$ |
|  | H.R.S | 1 hour at 37° C.+14 days at 2° C. | $10^{4.2}$ |

[1] $ID_{50}$: Immunizing mean dose.
[2] N.R.S.: Normal rabbit serum.
[3] H.R.S.: Serum from rabbit hyper-immunized against TG-cells and the culture medium.

As shown in above table, the anti-serum prepared against the elements of the virgin cellular culture possesses a marked anti-cellular power, without affecting in any manner the virus titre of the poliomyelitis prepared on said cultures.

*Example 2*

A mixture was prepared wherein $10^5$ $ID_{50}$ per milliliter of type 1 poliomyelitis virus were added to $10^{4.5}$ $ID_{50}$ per cc. of poliome virus. Said mixture was incubated, in equal volumes, with an anti-poliome rabbit serum having a titre 1:1280 against 8 hemagglutinating virus units. When, after one hour incubation at 37° C., and a subsequent additional storage period of 11 days at a temperature of +4° C., the viral mixture was tested in human cell cultures and in embryonic rabbit cell cultures, the poliomyelitis virus titre proved substantially unaffected, whereas the infectious poliome virus was no more traceable.

*Example 3*

A poliome virus suspension containing $5\times10^4$ $ID_{50}$, per milliliter, titring 1:5000 against 8 hemagglutinating units, was first neutralized by incubation during 1 hour at 37° C. with an anti-poliome serum, the mixture then submitted, during 1 hour at 37° C., either to the action of two different samples of normal human gastric juice (acidity HCl 4.8 and 5.1, respectively), or during the same interval of time to the action of trypsine (1:250) at 0.25%, in a 7.5 pH solution.

The active poliome virus investigation in all these mixtures had a negative result.

The method according to the invention thus enables, by means of a sero-neutralization, the elimination of viral contaminations, particularly by oncogenic viruses, from cellular cultures intended for the preparation of viral vaccines. In the obtained mixture formed by the vaccinating compound and the anti-serum, the elimination of the viral contaminations is selective, and the titre of the vaccinating virus is not affected even after a certain interval of time, by the presence of antibodies directed against all cellular and anti-cellular constituents of the culture medium on which said virus was prepared.

The neutralization efficiency will depend upon the ratio between the contaminating virus titre and the specific antibody serum contents, although the values of these two titres are hazardous. In practice, experience shows that the immunization of experimental animals with infectious viruses is efficient and fast, said viruses acting as very good antigenic substances.

The vaccine mixture according to the invention does in no degree reduce the effectiveness of the corresponding vaccine, while increasing at a maximum the chances against contamination risks of the subject vaccinated by means of intrusive viral agents.

What I claim is:

1. A method for preparing an anti-viral vaccine immunized against oncogenic viruses consisting in adding to a suspension of vaccinating virus obtained by propagation of said virus in cell cultures, at least one antiserum prepared in experimental animals immunized with corresponding intact cell cultures used for immunization prior to infection with said vaccinating virus, said antiserum containing antibodies against the normal constituents of the cells and the medium and antibodies against any undesired and uncontrolled virus contaminant which could be present in said cell cultures.

2. The method of claim 1 wherein the vaccinating virus is poliomyelitis virus.

3. A vaccine mixture consisting of at least one cellular culture used for the propagation of a vaccinating virus, wherein at least one known vaccinating virus is present, and of at least one antiserum effective against said cellular culture itself.

4. A vaccine mixture consisting of a cellular culture used for the propagation of the poliomyelitis virus, wherein known vaccinating poliomyelitis virus is present, and of at least one antiserum prepared against said cellular culture.

No references cited.

LEWIS GOTTS, *Primary Examiner.*

RICHARD L. HUFF, *Assistant Examiner.*